United States Patent
Kalevo et al.

(10) Patent No.: US 7,616,811 B2
(45) Date of Patent: Nov. 10, 2009

(54) METHOD AND SYSTEM IN A DIGITAL IMAGE PROCESSING CHAIN FOR ADJUSTING A COLOUR BALANCE, CORRESPONDING EQUIPMENT, AND SOFTWARE MEANS FOR IMPLEMENTING THE METHOD

(75) Inventors: Ossi Kalevo, Toijala (FI); Petri Nenonen, Tampere (FI)

(73) Assignee: Nokia Corporation, Espoo (FI)

( * ) Notice: Subject to any disclaimer, the term of this patent is extended or adjusted under 35 U.S.C. 154(b) by 647 days.

(21) Appl. No.: 10/568,319

(22) PCT Filed: Sep. 9, 2004

(86) PCT No.: PCT/FI2004/050130

§ 371 (c)(1),
(2), (4) Date: Feb. 14, 2006

(87) PCT Pub. No.: WO2005/029411

PCT Pub. Date: Mar. 31, 2005

(65) Prior Publication Data

US 2006/0269125 A1    Nov. 30, 2006

(30) Foreign Application Priority Data

Sep. 24, 2003   (FI) ................... 20035162

(51) Int. Cl.
*G06K 9/00*   (2006.01)

(52) U.S. Cl. ............. 382/167; 382/168; 382/162

(58) Field of Classification Search ............ 382/162, 382/165, 167, 168, 169; 348/223.1, 224.1, 348/225.1, 104; 358/518, 530, 506, 471, 358/475, 647
See application file for complete search history.

(56) References Cited

U.S. PATENT DOCUMENTS

| 4,922,335 | A | * | 5/1990 | Outa et al. | 358/506 |
| 4,969,053 | A | * | 11/1990 | Outa et al. | 348/104 |
| 5,357,354 | A | * | 10/1994 | Matsunawa et al. | 358/530 |
| 6,771,311 | B1 | * | 8/2004 | Weldy | 348/222.1 |
| 2002/0024609 | A1 | | 2/2002 | Matsushima | 348/362 |
| 2003/0174216 | A1 | | 9/2003 | Iguchi et al. | 348/223.1 |

FOREIGN PATENT DOCUMENTS

JP    02001128014 A  *  5/2001

OTHER PUBLICATIONS

Ashikhmin, M., "A Tone Mapping Algorithm for High Contrast Images", 2002, 13th Eurographics Workshop on Rendering, © Eurographics Association, pp. 145-155.

* cited by examiner

*Primary Examiner*—Anh Hong Do
(74) *Attorney, Agent, or Firm*—Harrington & Smith, PC

(57) ABSTRACT

A method in a digital image processing chain adjusts for a colour balance. In the method, the subject is imaged by pixels to form value-sets of the colour components, component-specific histograms are formed from the value-sets of the colour components, cumulative histograms are formed from the component-specific histograms, the illumination colour corresponding to at least one colour component is defined from the cumulative histograms, and using target colour and defined illumination colour are defined for at least two colour components, a gain factor adjusts the colour balance. In addition, a corresponding system, equipment, and software means implement the method.

Figure 1:
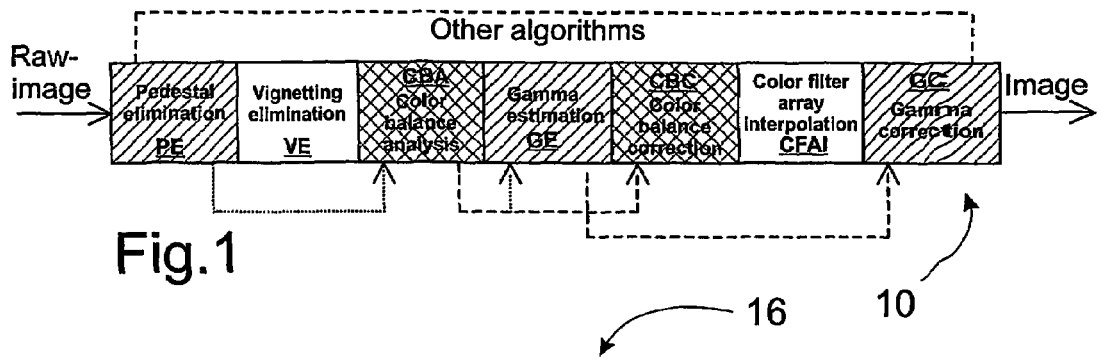

27 Claims, 5 Drawing Sheets $h_4$ = Illumination point

| i | % | $t_2$ | $t_1$ |
|---|---|---|---|
| 1 | 100 | 0 | 0 |
| 2 | 99,9755859375 | 3,0703125 | 1,046875 |
| 3 | 99,951171875 | 3,0703125 | 1,0546875 |
| 4 | 99,9267578125 | 3,0703125 | 1,0625 |
| 5 | 99,90234375 | 3,09375 | 1,0703125 |
| 6 | 99,853515625 | 3,09375 | 1,07421875 |
| 7 | 99,8046875 | 3,09375 | 1,078125 |
| 8 | 99,755859375 | 3,09375 | 1,08203125 |
| 9 | 99,70703125 | 3,1171875 | 1,0859375 |
| 10 | 99,609375 | 3,1171875 | 1,08984375 |
| 11 | 99,51171875 | 3,1171875 | 1,09375 |
| 12 | 99,4140625 | 3,1171875 | 1,09765625 |
| 13 | 99,31640625 | 3,140625 | 1,1015625 |
| 14 | 99,12109375 | 3,140625 | 1,10546875 |
| 15 | 98,92578125 | 3,140625 | 1,109375 |
| 16 | 98,73046875 | 3,140625 | 1,11328125 |
| 17 | 98,53515625 | 3,1640625 | 1,1171875 |
| 18 | 98,14453125 | 3,1640625 | 1,12109375 |
| 19 | 97,75390625 | 3,1640625 | 1,125 |
| 20 | 97,36328125 | 3,1640625 | 1,125 |
| 21 | 96,97265625 | 3,1875 | 1,125 |
| 22 | 96,19140625 | 3,1875 | 1,125 |
| 23 | 95,41015625 | 3,1875 | 1,125 |
| 24 | 94,62890625 | 3,1875 | 1,125 |
| 25 | 93,84765625 | 3,2109375 | 1,125 |
| 26 | 92,28515625 | 3,2109375 | 1,125 |
| 27 | 90,72265625 | 3,2109375 | 1,125 |
| 28 | 89,16015625 | 3,2109375 | 1,125 |
| 29 | 87,59765625 | 3,234375 | 1,125 |
| 30 | 85,05859375 | 3,234375 | 1,125 |
| 31 | 85,05859375 | 3,234375 | 1,125 |
| 32 | 79,98046875 | 3,234375 | 1,125 |
| 33 | 50 | | |
| 34 | 25 | | |

Fig.9

METHOD AND SYSTEM IN A DIGITAL IMAGE PROCESSING CHAIN FOR ADJUSTING A COLOUR BALANCE, CORRESPONDING EQUIPMENT, AND SOFTWARE MEANS FOR IMPLEMENTING THE METHOD

The present invention relates to a method in a digital image processing chain for adjusting a colour balance, in which method the subject is imaged by pixels to form value-sets of the colour components, component-specific histograms are formed from the value-sets of the colour components, cumulative histograms are formed from the component-specific histograms, the illumination colour corresponding to at least one colour component is defined from the cumulative histograms, using target colour and defined illumination colour are defined for at least two colour components, a gain factor adjusting the colour balance.

In addition, the invention also relates to a corresponding system, equipment, and software means for implementing the method.

As is known, the human visual system is able to adapt to different illumination colours. Objects in the field of vision appear to have unvarying colours within the range of variation of the illumination colour. An example of such a situation is one in which white objects are recognized as being white, in both sunlight and also in brilliant white illumination, despite the more bluish hue of sunlight. Once the illumination colour leaves the range of human adaptation, the degree of adaptation is reduced, but nevertheless some change in the colour is sensed. For instance, white objects then appear to be somewhat yellow when seen during sunset.

The mechanisms and operation of adaptation in the human visual system are still not fully known and understood. Adaptation takes place partly in the retina, in which the colour receptors' sensitivities change uniformly during a specific period, according to their stimulation. It is also known that other parts of the adaptation mechanisms are controlled by the cerebral cortex, in which the processes taking place are extremely complex.

Part of the adaptation processes appear to use so-called memory colours, when evaluating the correct colour balance. Examples of memory colours are colours like white, skin colour, grass, the sky, and generally other colours that have a specific primariness in specific instances.

The sensors used in digital cameras are not able to automatically provide an adaptability similar to that of the human visual system (nor even a functionality corresponding to the retina). The sensor determines the amount and colour of the light being reflected from the imaging object, but in no way the visual sensation related to it. Thus, images that have been taken, and to which no adjustments have been made, appear to have a distorted colour balance. This is because, when a person is viewing an object, their visual system adapts to the illumination of the environment, instead to the content of the image. White objects may appear to be blue or yellow, depending on whether the image is taken indoors or outdoors. Naturally, other colours too may appear, depending on the illumination.

Due to the above among other factors, some kind of colour-balance adjustment is made in digital camera equipment and in image-processing chains in general. The adjustment is very often termed automatic white balance, or simply white balance, if the adjustment is performed manually. The aim is to adjust the colour balance so that the image will look natural in neutral viewing conditions.

The problem concerning achieving a proper colour balance is, however, very difficult. The operation of the human visual system is extremely complex, and so far it has proved impossible to fully analyse and understand it. However, in general, the problem can be divided into two parts. These are 1) the estimation of the illumination colour while taking an image and 2) the definition of the type of correction required by it and the calculation and adaptation of an appropriate amount of correction to the taken image.

Automatic systems perform these tasks without requiring any actions by the user of the camera equipment. In manually performed illumination-colour adjustment methods, the illumination colour is set by an action of the user of the camera. The camera may have predefined settings, such as indoor and outdoor imaging modes, or colour-temperature adjustment. The user may also aim the camera at a known colour, which is typically white, and from which the camera then defines a correction, based on this selected reference colour.

A large number of solutions to the problems described above are disclosed in the prior art, because colour-balance adjustment is absolutely essential in digital imaging equipment. The adjustment can be implemented, either in the camera, or else as post-processing of a taken image, in some other device (for example, in an image-processing program in a PC).

From the user's point of view, perhaps the most satisfactory solution to the problem is to arrange an automatic colour-balance adjustment function in the camera, which is implemented in connection with the taking of the image. In such a solution, the user is not required to have any particular knowledge of image processing, or even generally of the control of the camera's adjustment buttons.

As is known, there are at least three basic types of adjustment for the illumination colour, which are based on using illumination-colour estimation algorithms.

Grey-world algorithms are one of the first of these algorithms. These are based on simple emulation of the adaptation ability of vision. In a simplified form, the average colour of the image is calculated in them. This assumes that the colour should be neutral, in other words, grey. The colour components of the image are then adjusted so that its average colour moves towards this grey. The aim is to control the amount of the adjustment in such a way as to take into account more or less the entire adaptability of human vision. Grey-world algorithms are very widely used as a basis for colour-balance adjustment algorithms in digital camera devices.

A second such adjustment algorithm is known as brightest white balance. As is known, a pure white surface will reflect the entire spectrum of illumination. Thus, the colour of white areas will also tell the illumination colour. When fully adapted, the white areas should remain white, so that the illumination colour can be directly compensated. The brightest areas of images are usually white surfaces, so that brightness can be used to search for white areas.

Colour saturation and hue can also be taken into account. These properties can also be used to determine the amount and type of colour-balance correction, in such a way that the adaptability of vision can be more or less taken into account. Due to the dominant importance of the white colour, the entire group of colour-balance algorithms are often called white-balance algorithms, even if they do not even measure the illumination colour from white, or balance the white colour.

Algorithms based on a maximum colour can be given as a third example. If the image has even one surface that perfectly reflects some part of the illumination spectrum, this part of the spectrum will then be known. If a perfectly reflecting surface exists for each part, the entire spectrum can be reconstructed. Typically, camera sensors do not measure the whole spectrum, but only some of its sub-bands, or colour channels. Thus, if the image contains combinations of surfaces, which perfectly reflect the parts of the illumination and so affect these colour channels, the effect of the illumination on the appearance of the image can be estimated.

Most digital cameras, though not, however, all, use three colour channels to record the colours of the view. These are typically red, green, and blue (RGB). To simplify slightly, this means that, if the image includes surfaces that perfectly reflect the illumination colour's red, green, and blue components, the illumination colour can be estimated from them.

Typically, the maximum value of each colour component is related to perfect reflection. With this assumption, it can be concluded that the maximum values of the colour components also determine the illumination colour. It should be noted, that quite often these values are reflected from the brightest white surface. In that case, the use of the method based on maximum colours will be close to the brightest-white algorithms. However, the presence of white is in no way essential when using the maximum-colour method. The most suitable colour spaces for the implementation are also different. Like other methods, methods based on maximum colour may adjust the amount and type of correction, based on the estimated illumination.

In addition, the methods described above can also be combined. Some methods may thus belong to more than one of the above groups. The colour balance can be made more robust by using several methods simultaneously and combining their results sensibly.

In camera-device-specific image-processing chains, the colour-balance algorithms must operate in co-operation with the other image-processing algorithms. The chain can be implemented in the actual camera device, or also as post-processing functions in some other device. Typical algorithms of the chain concern not only colour-balance adjustment, but also colour-filter-array interpolation (CFAI), digital gain control, black-level adjustment, noise reduction, vignetting correction, geometrical-distortion correction, image enhancements, such as sharpening and gamma correction, or some other kind of sensor-response correction.

The implementation of the chain can also be divided into functions to be performed in the camera and functions to be performed as post-processing. In addition, they can be implemented as both hardware and software solutions. The implementation can be completely separate from the implementations of other algorithms, so that they can take as input for analysis and processing only the image data from a previous algorithm, with no other information relating, for example, to the previous algorithm.

On the other hand, the algorithms may also co-operate very closely with each other. A typical example of this is an arrangement, in which the colour-balance algorithm can control gains in the colour components. The implementation of the solutions can both analog and digital. All in all, it would be extremely advantageous, if the colour-balance adjustment algorithm could be implemented as effectively and naturally in a camera-specific image-processing chain.

The main weakness in solutions according to the prior art is ineffective or erroneous operation. Their effect varies with the algorithm. A general problem with all methods (for example, in shots taken during sunset) is achieving a compromise between effectively operating colour-balance adjustment and the loss of the colour appearance of the view. In addition to this, each group of algorithms has its own typical cases of errors.

Grey-world algorithms adjust the colour content of the image in such a way that the average effect of the image becomes neutral. Their main problem is that neutral images are only optimal in some special cases. The cases are those in which there should be an equal number of all colours after balancing. An example of an opposite case to this is a portrait shot, in which the average colour should clearly be moved towards skin colours. This method is also extremely sensitive to large areas of colour in the image. These distort the colour balance towards the complementary colours of the subject. Several modifications have been used to increase the robustness of these algorithms. For example, the weighted averages of hue, saturation, or spatial distribution can be used to reduce the effect of highly saturated colours and large areas of colour. Similar problems nevertheless remain, unless the effect of the colour balancing is limited. In this case, many images, which would require balancing, will remain uncorrected.

Brightest-white-balance algorithms are extremely sensitive to saturation of the pixel values. If the dynamic area of the camera sensor is exceeded, the pixel values will be limited to the maximum value. A brightest-white-balance algorithm is extremely suitable for use with colour spaces that define the brightness signal. However, the sensor typically defines the colour from the RGB channels. Saturation will therefore also appear in the RGB domain. If all components are saturated, the brightest-white-balance method will erroneously estimate the illumination colour as white and as a result balancing will not be performed. If one or two components are saturated, an erroneous estimate will be found for some other illumination colour. These methods also require a white surface to be found in the image. Otherwise, the method will fail to estimate the illumination colour.

Methods based on maximum colour are also sensitive to saturation of the pixel values. Usually, these methods select some number of the brightest values, which define the illumination colour. Therefore slight saturation is permitted. In some cases, however, this causes problems. The algorithm also demands that perfectly reflecting surfaces must be found in the imaging object for all the colour components. As this condition is not met, for example, in the case of nature images, these methods too fail at times.

Problems have also been known to appear in functions that relate quite substantially to the success of colour-balance adjustment, or at least in their compatibility with it. One example of these functions is the need for biassing and vignetting elimination, caused by inferiority properties in the sensor. In many cases, it would be practically essential to bias the sensor in some way, as otherwise the sensor would produce a signal, even though what it detects is completely black. The need for vignetting elimination also usually arises from the sensor's 'inferiority', in which case darkening may appear in the edge areas.

As a prior art referring to the patent publications can be mentioned US-publications US-2003/0174216 A1 and US-2002/0024609 A1.

The present invention is intended to create a new type of method and system for adjusting colour balance in a digital image processing chain. The characteristic features of the method according to the invention are stated in the accompanying Claim 1 and those of the system in Claim 15. In addition, the invention also relates to corresponding equipment, the characteristic features of which are stated in Claim 20 and to software means for implementing the method, the characteristic features of which are stated in Claim 21.

In principle, in the method according to the invention, the object is imaged initially as pixels to form a value-set of the colour components (R, G, B), from which, according to one embodiment, at least all such individual pixel values, or image areas formed of several pixel values, in which one or more pixel values in even one value-set exceed/meet a selected criterion, are filtered out of each value-set, according to the method of the invention. Thus, for example, distortions caused by saturated pixels can be eliminated, when estimating the illumination colour.

Cumulative histograms of the colour components, from the colour curves of which an illumination colour ($R_{ill}$, $G_{ill}$, $B_{ill}$) corresponding to each colour component is defined, are then formed from the filtered value-sets.

In the method according to the invention, the illumination colour is defined from the flat area of the colour curve at the end of each filtered cumulative histogram. A common point $h_i$, in the which the ratio $C_i/C_{i+1}$ (or the difference) between the consecutive pixel-intensity values meets a criterion set for it, is sought from the flat area for at least one colour component. In a cumulative histogram, the interval of the points $h_i$, which is thus the same for each colour component, can be set to be quite suitable, because, among other things, the saturated pixels are filtered out in a previous stage of the method. The illumination colours thus defined are then used to form componentwise mappings that adjust the colour balance. As such, the illumination color can be compensate by using any known method. The invention mainly relates to this definition of the illumination colour. In one embodiment, the flat area is recognized using two colour components and at least one colour component is adjusted.

The use of the method according to the invention permits the robust and effective control and type definition of the colour-balance correction gain. In addition, it achieves good results in difficult lighting conditions too.

The colour-balance adjustment method according to the invention can be very effectively implemented in camera-specific imaging chains. It can be made to operate naturally in co-operation with other algorithms. The degree of complexity of the method, which remains reasonable, makes it applicable to camera devices, for instance. However, the method can also be applied, for example, to post-processing taking place outside a camera device.

According to one embodiment, three sub-criteria are used to define the illumination colour in the method according to the invention. In them, the pixel (intensity) value relations corresponding to consecutive cumulativity distributions are compared in a set manner to the criterion values set for them. The criterion values can be based, for example, on experiential data that have been shown to give good results in colour-balance adjustment.

According to another embodiment, prior to colour-balance adjustment according to the invention, pedestal elimination, for example, can also be performed on the raw-matrix pixel values. This will significantly reduce the unnecessary signals produced by the sensor.

Yet other functionalities that can be integrated in the method according to the invention include vignetting elimination, dark-colour correction, and gamma correction.

The method according to the invention can even be implemented in a fully automated manner in a camera device, but also, however, as post-processing. In addition, the user's own discretion can easily be connected to the method.

The method and system according to the invention can be quite easily integrated in both existing image-processing chains and camera devices, as well as in those presently being designed. The method according to the invention scarcely adds so much complexity to a camera device that it would cause a noticeable detriment to, for instance, the processing power of the equipment or its memory use. According to one embodiment, even the method implemented on a purely software level can be integrated extremely easily in, for example, camera devices. Purely hardware-level implementations and combinations of hardware/software level implementations are naturally possible. The method may be implement either automatic or half-automatic.

Other characteristic features of the method, system, equipment, and software means according to the invention will be apparent from the accompanying Claims while additional advantages that can be achieved are itemized in the description portion.

Figure 2:
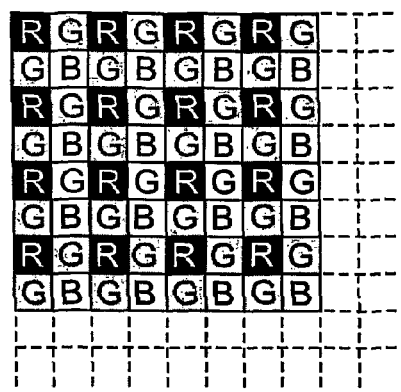
Figures 3A, 3B:
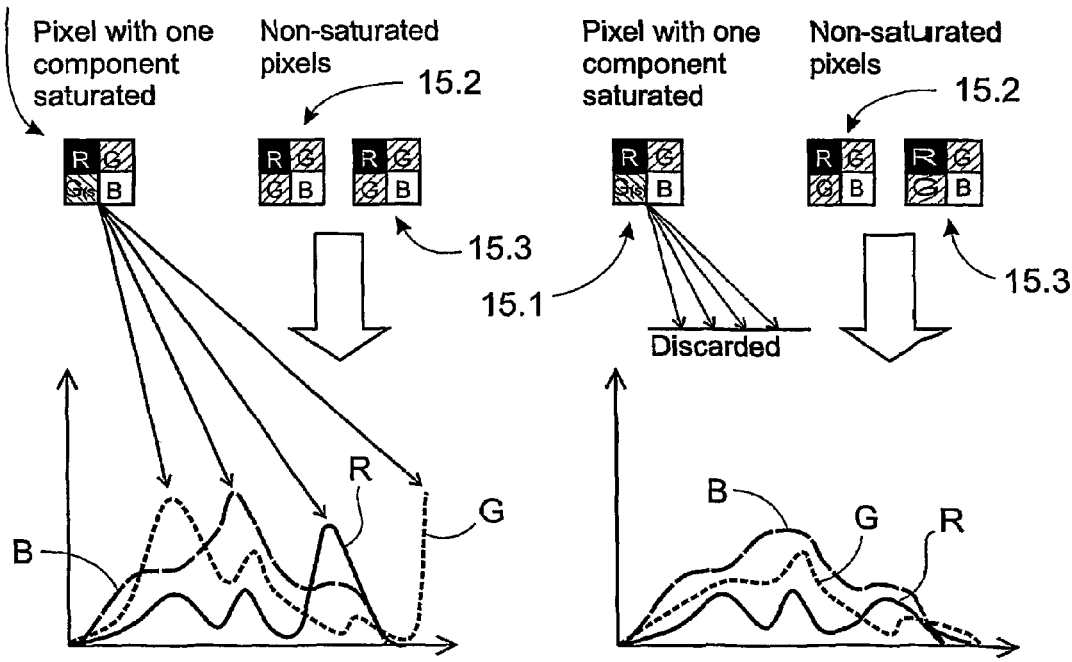
Figure 4A:
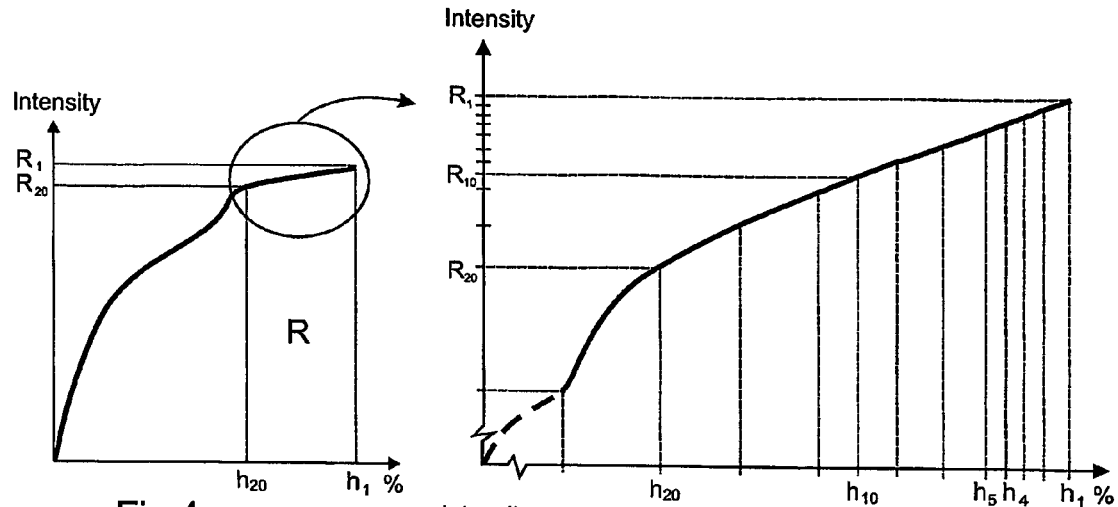
Figure 4B:
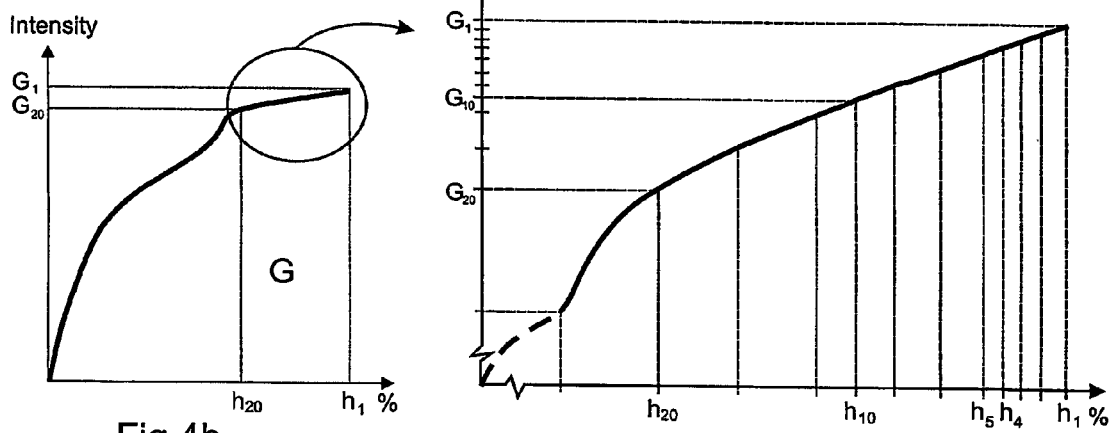
Figure 4C:
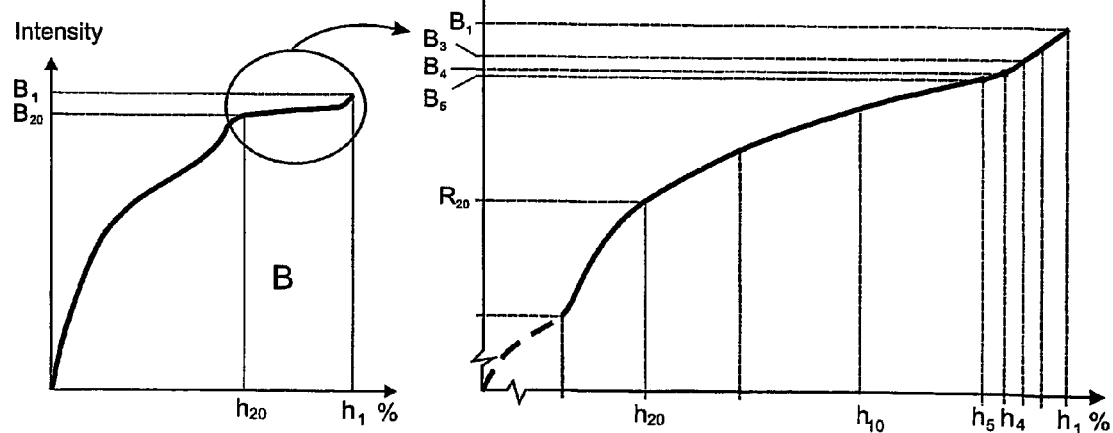
Figure 5:
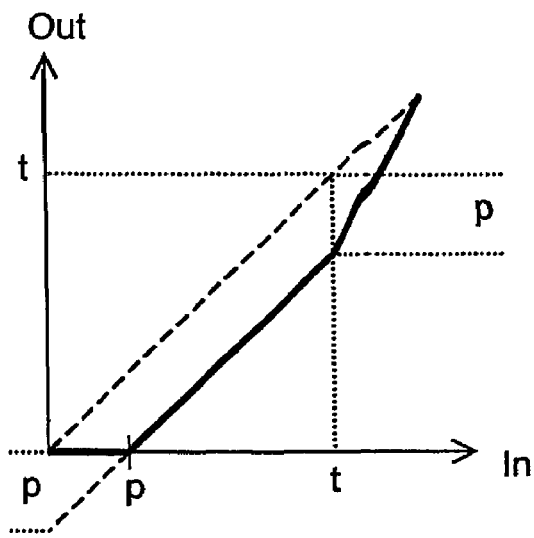
Figure 6:
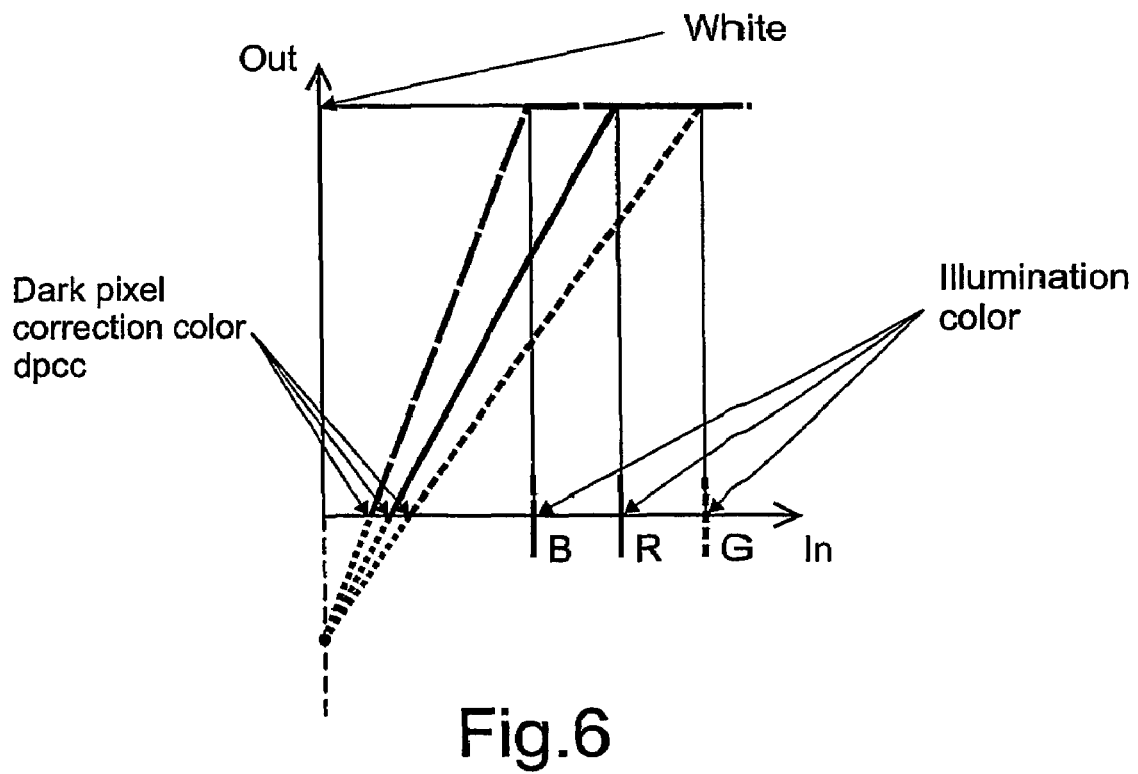
Figure 7:
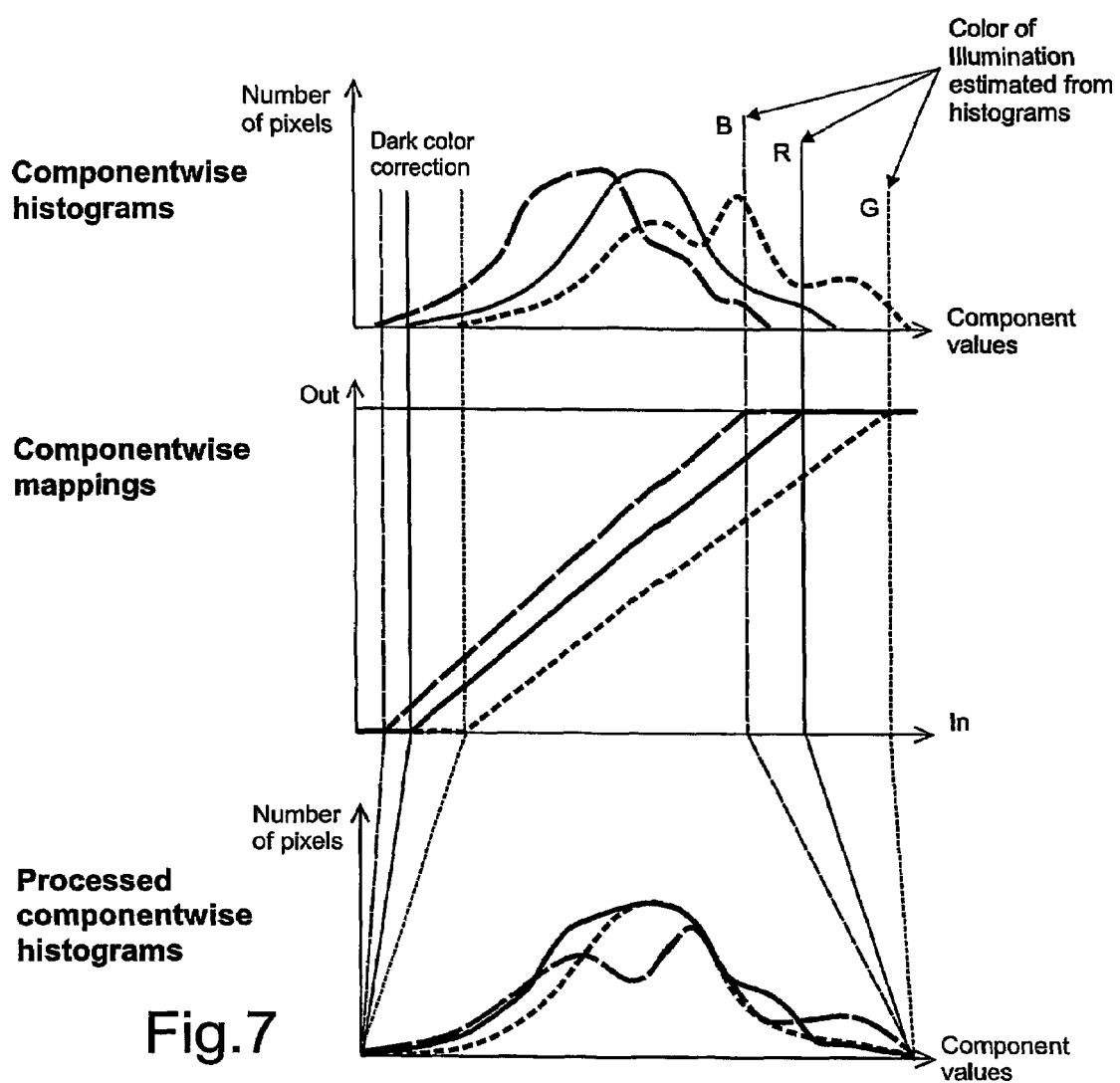
Figure 8:
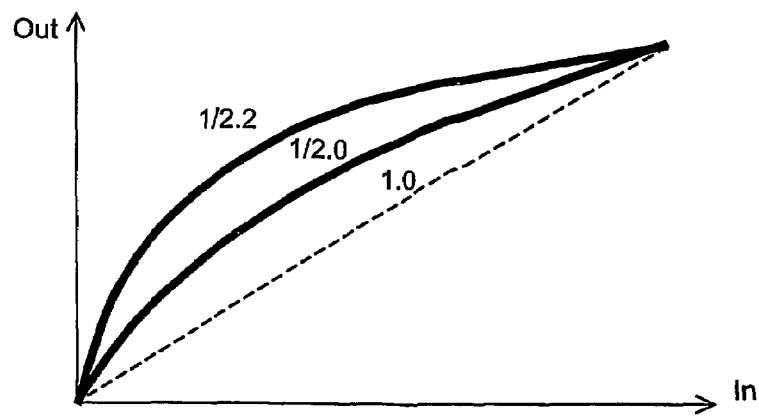

In the following, the method, system, equipment, and software means for implementing the method, according to the invention, which are not restricted to the embodiments described in the following, are described in greater detail with reference to the accompanying drawings, in which FIG. 1 shows a schematic diagram of one example of an image-processing chain according to the invention, FIG. 2 shows one example of colour-component pixels in a sensor, FIGS. 3a and 3b show a comparison between the prior art and the method according to the invention, when forming componentwise histograms from them, FIGS. 4a and 4c show componentwise cumulative histograms as schematic embodiments in connection with the method according to the invention, FIG. 5 shows a schematic diagram of the principle of offset correction, FIG. 6 shows a schematic diagram of the principle of dark-colour correction, FIG. 7 shows the processing of histograms, according to the method of the invention, FIG. 8 shows examples of gamma-correction curves as examples in principle, and FIG. 9 shows tabled examples of the criterion values used in the colour-balance adjustment method according to the invention.

The schematic diagram in FIG. 1 shows one example of a digital image processing chain 10 according to the invention. Such an image processing chain 10 can be arranged, for example, in a digital camera device, or in general in a device equipped with a camera sensor, which can be found nowadays, for instance, even in mobile stations. The colour-balance correction method according to the invention is very suitable for numerous different camera-specific imaging chains, the implementation of which can naturally differ from that shown in FIG. 1. In addition, the chain 10 can naturally also be applied to post-processing, for example, implemented with software means (e.g., in connection with image-processing software).

Co-operation between the colour-balance adjustment method and other functions arranged in the image-processing chain 10 can also be quite easily implemented effectively. In this case, the method according to the invention is shown in an image-processing chain 10, which includes CFAI, vignetting elimination VE, sensor pedestal elimination PE, and gamma correction/estimation GE, GA. Any point at all of the chain 10 can naturally also include other signal-processing functions, one example of which is colour gamut conversion CGC (not shown), arranged before gamma correction.

The actual colour-balance adjustment method according to the invention includes several sub-stages, such as the illumination colour estimation stage CBA, and correction stage CBC. FIG. 1 shows how the colour-balance adjustment stages CBA, CBC relate to the other functions in the imaging chain 10. In FIG. 10, the cross-hatched blocks CBA, CBC are the core components of the method. The hatched blocks PE, GE, GC can operate in close co-operation with the method according to the invention. The unhatched blocks VE and CFAI can be independent, but also relate to the colour-balance adjustment.

Next, the method and system according to the invention are described in an image-processing chain 10 according to the invention, of a kind that can be, for example, in camera equipment according to the invention, as an individual example of an application, starting from the functions CBA, CBC relating to colour-balance adjustment.

The first stage of the actual colour-balance adjustment is the estimation of the illumination colour $R_{ill}$, $G_{ill}$, $B_{ill}$. In the method according to the invention, the estimation is performed on the basis of the colour-component histograms of the image. Componentwise colour curves are then formed from the main colours R, G, B.

The brightness/darkness (intensity) of the pixels are depicted on the X-axis of the histograms, so that, for example, the right-hand end of the X-axis is the bright end and the left-hand end the dark end. Similarly, the Y-axis is used to depict the number of pixels corresponding to each brightness level. The formation of the histogram represents a technique that is, as such, known, and is therefore not described at greater length in this connection. The histograms of the signal values (i.e. intensity values) of each colour component (R, G, B) are measured separately from each other.

The componentwise histograms can be gathered either from the interpolated signals, or also before the interpolation of the signals, which is used in this implementation example. This means that the colour-component histograms can be defined from raw image data, in which each physical pixel of the camera sensor represents only one colour component. Though in this case the sensor's colour system is described at the RGB level, other techniques too (CMYK, YUV, etc.) will be obvious to one versed in the art.

A typical implementation for performing such an operation is, for example, the well-known Bayer-matrix arrangement, shown in FIG. 2. More generally, this means the depiction of the subject by pixels to form value-sets [R], [G], [B] of the colour components R, G, B. In the case of the RGB application example described in the application, two pixels out of four are green while one pixel is red and one is blue. There are more green pixels, because green best depicts the luminance and is thus important from the point of view of the eye. However, such a sensor is also possible, in which, for example, only every fifth pixel represents the colour green G. Sensors are typically more sensitive to green than to red or blue.

The histograms are collected by scanning through the pixels of the image. The number of incidences of each possible signal level is calculated for each colour component R, G, B. Thus, for example in the case of an RGB image, three histograms are obtained, which are shown in FIG. 3a.

However, a important drawback can be seen in the case shown in FIG. 3a, which relates generally to the prior art in illumination-colour estimation. This problem is caused by the detrimental effect of possible saturated pixels, even a single saturated pixel $G_{(s)}$ in an image point 15.1-15.3 of each shot being sufficient to disturb the other pixels R, G, B of the image subject. In the histogram 3a, this means a large number of pixels with the highest signal value. This leads to problems that were described in greater detail earlier in the application. This appears as peaks in the histograms visible in each colour curve R, G, B, (in FIG. 3a).

In the method according to the invention, in the histogram's collection stage, not only are these saturated pixels $G_{(s)}$ surprisingly rejected, but so are the corresponding pixels R, G, B of the image point 15.1. FIG. 3b shows the effect of such a procedural stage on the histograms in the method according to the invention. This operation removes the high peaks of the histograms, which would otherwise cause an error in the estimation of the illumination colour appearing even in the prior art.

The filtering of the pixel values from each value set [R], [G], [B] is carried out before the cumulative histograms are formed. The filtering is directed at such pixel values $G_{(s)}$, or, in addition to them, to the pixels of such image points 15.1, in which even a single pixel value of the same image point 15.1, in even a single value-set [R], [G], [B] of the image point exceeds or meets the selected criterion set for it.

Estimation of the illumination colour according to the invention is not disturbed by the rejection of these saturated pixels $G_{(s)}$ and of other pixels R, G, B too over the same image point 15.1,—on the contrary the colour estimation is made more reliable. The limit point defining the saturation, i.e. the criterion value, can be set to make the method advantageously compatible with, for example, the pedestal-elimination stage to be described later in greater detail. The advantageous value depends on the general arrangement of the implementation. In example case, it is possible to use the criterion value that is obtained, if the factor pedestal value/2 is deducted from the maximum signal value, in which the pedestal value can be, for example, 64. The dark end can also be processed similarly.

Thus, if even one of the colour components R, G, B of the pixels of the same image point 15.1 is saturated ($G_{(s)}$), then the other component values R, G, B of the image point 15.1 are also rejected. In the case of a raw image, for which CFAI has not been carried out, this means that all the colour components R, G, B, belonging to the same raw-pixel group 15.1 are rejected. This and its effects on the collected histograms are illustrated on a schematic level in FIGS. 3a and 3b.

In FIGS. 3a and 3b, there are two raw-pixel groups 15.1-15.3, in one of which the saturation problem in question appears in a green pixel $G_{(s)}$. Peaks then form in the histogram of FIG. 3a, the formation of which takes into account all image points, i.e. raw-pixel groups 15.1-15.3. In FIG. 3b, the raw-pixel group 15.1, which causes the problem, is rejected, so that the histogram curves R, G, B of the components become substantially less steep.

In the following stage of the method, the illumination colour is estimated from the histograms formed from the filtered colour components. FIGS. 4a-4c show the cumulative histograms of the colour components R, G, B, which are formed from the actual histograms and from which the saturated pixels $G_{(s)}$ and their corresponding image points 15.1 have been filtered out as described above. According to one embodiment, the cumulative sum of pixel percentage proportions, or the number of pixels, or some other quantity corresponding to a number/proportion of pixels can be shown, for example, at predetermined selected intervals on the X-axis in the cumulative histograms, in which case the intensity values corresponding to them can be shown on the Y-axis. In an example case according to the embodiment, the pixels' cumulative percentage proportions $h_i$, for example, set at predetermined intervals on the X-axis, state how great a proportion (or number) of the filtered pixels is before the intensity point $R_i$, $G_i$, $B_i$ corresponding to them.

In the methods according to the prior art, the illumination colour is estimated from the points of the cumulative histograms, using a set colour representing a specific percentage proportion of pixels with values lower than the reference value.

In the method according to the invention, the illumination colour is defined from an essentially flat area at the brightest end of the filtered cumulative histograms (the right-hand end of the colour curve in the histograms in FIGS. 4a-4c). In this flat area, or area that can be considered to be essentially flat (compared, for example, to the other areas of the curve), the curve of the histogram no longer substantially rises according to its set criterion conditions, i.e. the intensity value of the colour no longer substantially changes according to the conditions set for it.

In one embodiment, an essential part is played by the procedure for searching for the flat areas of the colour curves, carried out from the cumulative histograms from which saturation pixels $G_{(s)}$ and the their image points 15.1 have filtered out. After the setting of the predefined cumulative pixel-proportion points $h_1, h_2, \ldots, h_n$ attached in a set manner and the intensity values $(R_1-R_n, G_1-G_n, B_1-B_n)$ corresponding to these points have calculated, according to the main principle of the method of the invention a search is made in the flat areas of the colour curves R, G, B for a common point $h_i$, defined at set intervals for each colour curve R, G, B, and at which the ratio $C_i/C_{i+1}$ (C=R, G, B) of the pixel-intensity values corresponding to the consecutive points $h_i$, $h_{i+1}$ defined at set division intervals meets the criterion values set for it.

The illumination colour $R_{ill}$, $G_{ill}$, $B_{ill}$ is defined by analysing the sequential intensity values $C_i$, $C_{i+1}$ corresponding to these points $h_i$, according to the method of the invention. It will be observed that, if the filtering stage of the saturation of the pixel values is bypassed, the method is largely that according to the prior art, in which a set of points $(R_i, G_i, B_i)$, which depends on the currently selected percentage threshold, in estimated to be the colour of the illumination.

In the method according to the invention, the colour is, however, estimated using a more highly developed algorithm, which sets specific sub-criteria for the points $h_i$ corresponding to the illumination colour $(R_{ill}, G_{ill}, B_{ill})$.

The points $h_i$, corresponding to the illumination colour $(R_{ill}, G_{ill}, B_{ill})$ are sought by increasing the value i, until the flatness condition set for the colour curve is met essentially for each curve R, G, B. The intensity value $R_i$, $G_i$, $B_i$, which is generally different for each colour component, corresponding to the point $h_i$ (i.e. the percentage proportion corresponding to the point in question) is set as the illumination colour $(R_{ill}, G_{ill}, B_{ill})$.

According to one embodiment, this criterion can also be stated as three sub-criteria. In the first stage of these sub-criteria, it is possible to search each of the colour-component curves R, G, B for such a point $h_i$ common to the curves R, G, B, in which the ratio $r_c$ of the pixel intensity values $C_i$, $C_{i+1}$ corresponding to the consecutive points $h_i$, $h_{i+1}$ set in a particular manner, is less than the first threshold value $t_1$ set for it. In other words, the sub-criterion can also be formulated mathematically in such a way that $$r_C = \frac{C_i}{C_{i+1}} < t_1,$$

in which $$C = (R, G, B)$$

As the next sub-criterion stage in the method, an examination can be made as to whether the sum of the ratios $r_R, r_G, r_B$ of the pixel values meeting the first sub-criterion searched in the first stage is less than the second threshold value $t_2$ set for it. If this condition is not met, a return is made to the first stage to seek a new trio of colour-components meeting the first sub-criterion, all of which will thus be at the same percentage-proportion point $h_i$, but the intensity values $R_i$, $G_i$, $B_i$ corresponding to this point $h_i$ generally differ from each other. This second sub-criterion can also be formulated mathematically, in such a way that $$\frac{R_i}{R_{i+1}} + \frac{G_i}{G_{i+1}} + \frac{B_i}{B_{i+1}} < t_2$$

If the second sub-criterion is not met in the percentage-proportion point $h_i$, the procedure returns to the first sub-criterion stage. However, if the second sub-criterion too is met using the trio of colour components that have been found (which are found at the point $h_i$), the procedure moves to the third sub-criterion stage.

In the third sub-criterion stage, an examination is made as to whether the ratio between the maximum pixel-value change and the minimum pixel-value change of the relative speeds of the changes of the pixel values $R_i$, $G_i$, $B_i$ found in the first sub-criterion stage is less that the third threshold value $t_3$ set for it. The condition can also be formulated mathematically, in such a way that $$\frac{\max((C_i - C_{i+1})/C_{i+1}), \text{ in which } C \in R\|G\|B)}{\min((C_i - C_{i+1})/(C_{i+1}), \text{ in which } C \in R\|G\|B)} < t_3$$

Columns 3 and 4 of table 9 show examples of listings of the threshold values $t_1$, $t_2$, which have been shown experimentally to be valid. The threshold value $t_1$ can be set in such a way that it is, for example, between 1.04 and 1.125, in which it is increased at intervals that have been shown experimentally to be valid, starting from a base value of 1.04, corresponding to the index value 1. The threshold value $t_2$ can be set in such a way that it is, for example, between 3.07 and 3.24, in which is it increase at intervals that have been shown experimentally to be valid, starting from the value 3.07, corresponding to the index value 1. The threshold value $t_3$ can be set to be, for example, approximately 4.

The index i, corresponding to the preset percentage-proportion values can be increased, for example 31 times, at intervals shown experimentally to be valid. In table 9, the percentage-proportion set $h_1$, arranged to be fixed in the cumulative histograms, can be set according to column 2. The index i=1 corresponds to the greatest intensity value (100%) set in the histogram from the colour component in question, in which the saturated pixels $G_{(s)}$ and the pixels R, G, B formed at the same image point 15.1 as the saturated pixel $G_{(s)}$ are filtered out when collecting the histograms. The intensity values diminish according to the tabled percentage proportions, i.e., for example, at the point $h_{10}$ 99.6% of the intensity values set in the histogram which are smaller than or equal in magnitude to the point corresponding to the intensity value in question. Once 31 steps have been taken using the percentage-proportion intervals described, it is finally quite assumable that a colour trio $(R_{ill}, G_{ill}, B_{ill})$ meeting all the sub-criteria has been found for the colour of the illumination. The finding of such a colour trio will assist in filtering out using the described percentage-proportion division of precisely the saturated pixels $G_{(s)}$ and the image points 15.1 consisting of them, in the histogram-collection stage.

If, for some reason, the situation is such that an index point i meeting the sub-criteria cannot be found, then in that case, the index value i=32 in question is selected without comparisons as the reference point, i.e. as the brightest flat area and the intensity values of each colour component R, G, B corresponding to the said point $h_{32}$ are selected as the corresponding illumination colour.

The index values i=32-34, at the end of Table 9, can be used, for example, in the selection of the gamma value and in checking the correctness of the colours.

The value sets of the threshold values $t_1$, $t_2$, $t_3$ are based on experimental observations, made by the applicant, of a good estimation procedure for illumination colours, there being thus no particularly logical explanation of them.

Once still a very schematic level, reference is made by way of example particularly to the insets in FIGS. 4a-4c, which insets show enlargements of the flat area, from which the common percentage-proportion point $h_i$ of the histograms R, G, B is sought. It must be understood, that the histograms in the insets are shown with very greatly exaggerated steepness while in other ways too the descriptors may be quite unreal, due to the similarity of their form, but in this case they are only intended to demonstrate the basic principle of the method according to the invention.

It can be seen from the histograms R and G that the flat area in them, extending to the extreme right-hand end of the histogram begins, at least compared to histogram B, already quite early. Thus in principle the colour curves R and G would meet the sub-criteria according to the method of the invention already at their extreme right-hand end, or at least closer to the extreme end than in the case of colour curve B.

On the other hand, a percentage-proportion interval $h_1$-$h_4$, between which the intensity of the colour B changes quite sharply, at least compared to the colour components R and G, and which is substantially steeper than the still flat area at the extreme right-hand end of such a flat area, can be seen in the histogram B. This rise in the cumulative histogram B can be caused by, for example, the illumination conditions prevailing in the imaging situation, precisely due to which the colour balance of the shot must be corrected, in order to eliminate the effect of the illumination colour.

When using the method according to the invention, with reference to the insets of FIGS. 4a-4c, the percentage-proportion point $h_i$ meeting the set criteria common to each of the colour components is now found at point $h_4$, at which a flat area meeting the sub-criteria according to the method of the invention is found from the histogram of the colour component B. The corresponding illumination colour $R_{ill}$, $G_{ill}$, $B_{ill}$ is now obtained from the intensity value $R_4$, $G_4$, $B_4$ corresponding to point $h_4$, which is generally different for each colour component R, G, B.

Using the sub-criteria defined above, a surprisingly robust estimate of the illumination colour ($R_{ill}$, $G_{ill}$, $B_{ill}$) can be made. In addition, the reliability of the estimate can be tested using suitable algorithms and the results obtained from them used to decide on the amount of correction required and whether possible readjustment is required.

The amount of correction, in other words, the gain factor $G_R$, $G_G$, $G_B$, is used to adjust the colour balance. The amount of correction is directly related to the set target level $R_{tgt}$, $G_{tgt}$, $B_{tgt}$, to which each estimated illumination colour is converted. The gain factor for each colour R, G, B adjusting the colour balance is obtained using the target colours $R_{tgt}$, $G_{tgt}$, $B_{tgt}$ and the illumination colours $R_{ill}$, $G_{ill}$, $B_{ill}$ defined in the manner described above corresponding to each colour component R, G, B, in which $$G_R = R_{tgt}/R_{ill}$$

$$G_G = G_{tgt}/G_{ill}, \text{ and}$$

$$G_B = B_{tgt}/B_{ill}.$$

In full-level correction, the aim is to make the illumination white (tgt=white; the value on the corresponding scaling then being 1000). The colour-component signals are then amplified using the gain factor, in such a way that the colour of the illumination becomes white. The target level can be reduced as the number of saturated pixels increases, or as the brightness of the original image diminishes. This is because it is not wished to set the gain too high as the brightness of the image diminishes, instead an image taken in the dark should be slightly darker than an image taken in light.

Colour-balance adjustment can be made even more robust by suitably processing the defined gain factors $G_R$, $G_G$, $G_B$. For example, the gain factors $G_R$, $G_G$, $G_B$ can be compared to each other and can be required to meet the following conditions for every possible combination:

$$k_{min} G_{Cref} G_c \leq Cl_{ref} G_{Cl} \leq k_{max} G_{Cref} G_C,$$

in which $C=(R\|G\|B)$ ja $Cl=(R\|G\|B, Cl \not\subseteq C)$ $$k_{min} < 1, k_{max} > 1$$

In that case, the correction factor $G_R$ of the red colour C1=R, will have a specific interval compared to the correction factor $G_G$ of the green colour G. This same applies to all the colours R, G, B relative to the other colours R, G, B. According to one embodiment, in these conditions, it is possible to set, for example, $k_{min}=0.66$ and $k_{max}=4/3$. The value $G_{Cref}$ depicts the mutual relation of the colour components in standard illumination, relative to which the colour-sensitivity property of the sensors gives rise to a need for definition. This is because the sensors are typically more sensitive to the green component G than to the red component R and the blue component B. Making an automatic correction will depend on, for example, the sensor manufacturer. If automatic correction has been made, then the reference value will typically be 1 for all the colour components. If correction has not been made, then, for example, $G_{Gref}=1$ can be set for green G, in which case red can be correspondingly $G_{Rref}=1.6$ can be set for red R and $G_{Bref}=2.1$ for blue B.

It should be understood that these numerical values can vary to some extent, and are thus in no way bound to those stated here. These values are also based on experimental results, which appeared during the pilot stage of the development of the algorithm. The gains $G_R$, $G_G$, $G_B$ are varied, until the aforementioned condition is met.

By using these modified gain factors $G_R$, $G_G$, $G_B$, a median value can also be calculated for each colour component R, G, B. If it is noticed that the difference between the median value of the selected reference colour component and the median value of a another colour component is great, the gains are then adjusted, so that the difference between them is reduced. For example, the green colour component G can be used as a reference colour component.

Further, as a final restriction to the gain factor $G_R$, $G_G$, $G_B$, a condition can be set, that each of them must be between:

$$G_{min} \leq G_C \leq G_{max},$$

in which $C=(R,G,B)$

Here, the value $G_{min}$ i.e. an absolute value, can be set as, for example, 1 and the value $G_{max}$ as, for example, 16, according to one embodiment, for example, 10.

If the aforesaid restriction is not met in the case of any of the predefined factors $G_R$, $G_G$, $G_B$, the gain factor or factors in question are modified and the other factors are correspondingly readjusted in the same relation.

Once the gain factors $G_R$, $G_G$, $G_B$ have received their final form, they can next be used to form componentwise mappings for each colour component R, G, B, which will adjust the colour balance. In these mappings, the sub-index In refers to the colour detected by the camera sensor while the sub-index Out refers to the colour corrected by the gain factor ($G_R$, $G_G$, $G_B$), i.e.

$$R_{Out} = G_R * R_{In},$$

$$G_{Out} = G_G * G_{In}, \text{ and}$$

$$B_{Out} = G_B * B_{In}.$$

The componentwise original histograms are shown in the upper descriptor in FIG. 7 while the middle descriptor shows the componentwise function mappings of them formed from them using the gain factors defined according to the method of the invention, in which the illumination color is thus taken into account according to the method of the invention. The lowest histogram shows componentwise histograms processed according to the method of the invention, in which so-called offset reduction, by means of which the contrast of the dark end is increased, are also taken into account.

In the method according to the invention, other operations besides the automatic adjustment CBA, CBC of the colour balance, described above, can be applied to the image-processing chain system 10, arranged in the camera device itself, or alternatively also in an peripheral device.

FIG. 5 shows a first example of these operations, which is known as so-called pedestal elimination PE, i.e. as an offset correction of the pixel values performed on the raw matrix. As can be seen from FIG. 1 illustrating the image-processing chain, this correction can be performed in the chain 10, on the raw image obtained directly from the sensor.

Offset is a minimum value defined from the colour signal, which is obtained if, for instance, a completely dark shot is captured. The sensors of digital camera devices can have different offsets for each colour channel. However, it would be important from the point of view of the operation of adjustment of robust colour balance, for the offset to be removed as flawlessly as possible and that for the sensor to be thus linearized. Removal can be arranged to be permanent and sensor-specific, provided the same offsets are systematically increased in the colour-component signals. Adaptive modes can also be used.

Independently of the manner of implementation, in the prior art, in the principle of offset correction of pixel values, the offset values are used to reduce the pixel values. However, in pilot-stage tests, such an operation has been shown to reduce the dynamic area of the signal, because the brightest values are then also reduced.

In the method according to the invention, the offset correction of the pixel values is performed at least partly linearly. According to one embodiment, this can be carried out, for example, by removing the pedestal p by a direct subtraction calculation, if the signal level of the pixels is below the limit value t set for it. If the signal level of the pixels exceeds the set limit value t, the pedestal p is subtracted, but at the same time the signal is also amplified, so that the maximum signal level does not substantially drop.

Such a pedestal elimination stage PE is particularly advantageous, for example, in the case of the method according to the invention, when the illumination colour is estimated and an attempt is made to essentially eliminate the effect of the saturated pixel values. In the manner described above, i.e. performed partly linearly, a saturated pixel will remain saturated in the pedestal-elimination PE.

The performance in principle of the pedestal elimination PE carried out according to the invention can be described using the following equations, with reference to FIG. 5

$$y = 0, \text{ when } x < p$$

$$y = x - p, \text{ when } p \leq x < t$$

$$y = x - p + \frac{x-t}{x_{\max} - t} p, \text{ when } x \geq t$$

in which $p$ = pedestal $ja$ $t$ = threshold value

The co-ordinate axis analogy is clearly applied in such a way that y=Out and x=In. In these equations, it can be that, for example $x_{max}$=1023, p=64, and t=$x_{max}$-(p/2)=>1023-(64/2) =991.

According to yet another embodiment, the image processing chain 10 can also include so-called edge correction, which is also known in the terminology of those versed in the art as vignetting elimination VE. Vignetting elimination VE can be arranged in the image-processing chain 10, for example, after pedestal elimination PE. One advantage of using vignetting elimination VE is a reduction in corner darkening in images. The darkening of the corners of an image is generally caused by the optics and the physical properties of the sensor. The vignetting phenomenon is characterized by a diminution in the luminance value of the image, starting from the centre of the image and proceeding radially towards the corners of the image.

A vignetting-elimination algorithm VE according to the invention can be used to compensate for this drawback, in such a way that it applies an offset that varies spatially in the image and a vignetting-phenomenon correction factor vf, which can depend on, among other things, the location of the pixels. The value of the correction factor vf increases as the distance r of the vignetting phenomenon from the centre point increases.

The centre point (r=0) can be set to be, for example, in the centre of the image. The correction factor vf can be developed as a function dependent on sensor-specific parameters and the distance. The parameters can be defined, for example, using calibration imaging, in which the sensor is used to image a white surface with standard illumination and from which a suitable base estimation of the parameters is used to define parameters such that they can be used to eliminate the vignetting phenomenon. The distance r can be determined in a way that is, as such, known (for example, Pythagoras's theorem), in which, however, the so-called aspect ratio must be taken into account as an additional coefficient. Vignetting elimination is obtained directly, if each pixel value is multiplied by the factor vf corresponding to the distance r corresponding to it. In addition, account must also be taken of the fact that the correction factor can also be developed separately for each colour component $R_{vf}$, $G_{vf}$, $B_{vf}$, due to their different manners of attenuation. If the colour components are attenuated separately, then it would be good to correct the error arising from this, so that it will not cause an error in the actual colour-balance adjustment.

It is advantageous to arrange the vignetting elimination algorithm VE in such a way that it comes in the image-processing chain 10, for example, after the pedestal elimination PE and before the colour-balance estimation stage CBA, because in that case there will be no possible dark corners in the image to distort the actual colour-balance adjustment CBC.

FIG. 6 shows an example of a further sub-stage that can possibly be attached to the method according to the invention. As the final sub-stage in an image-processing chain according to the invention, there can, according to one embodiment, also be dark-colour correction. In it, values meeting a specific particular threshold set form them are sought from the cumulative histograms. In the dark-colour correction, the darkest colour component, determined on the basis of the threshold value, is stretched by a set amount towards black and the other components are also processed in the same proportion. The stretching takes place by adding an offset of a set magnitude to the colour-conversion functions, as in FIG. 6.

According to one embodiment, the dark-end threshold value can be defined, for example, in such a way that an intensity point correspond to, for example, 1% of the number of pixels is sought from the histograms of each of the colour components R, G, B. After this, the intensity values corresponding to the 1%-point of each colour component are multiplied by a current correction coefficient corresponding to each colour component and the smallest of the modified intensity values thus obtained is selected, which modified intensity value is further multiplied by 0.7 and is then selected as the magnitude of the correction.

The magnitude of the correction defined and selected above is next divided by the current correction factors $G_R$, $G_G$, $G_B$, as a result of which division offset values OffsetR, OffsetG, OffsetB are obtained for each colour component. It should be noted that the offset values do not effect the colour, but only stretch it to become darker. In order that the colour-balance adjustment target level can be made to remain as it was originally intended, newly adjusted correction factors $G_R'$, $G_G'$, $G_B'$ must still be defined. If there are no dark points in the image, the contract can be (slightly) increased.

The lowest histogram in FIG. 7 shows an example depicting a histogram obtained by the correction of the colour of the dark pixels, in which, when correcting the colour of the dark pixels, an offset defined in the aforementioned manner is added to the conversion functions, resulting in the readjustment of the amplification of the conversion functions. As a result of the correction of the dark end, the conversion functions receive the following form $R_{Out} = G_R'*(R_{In} - \text{Offset}R)$, $G_{Out} = G_G'*(G_{In} - \text{Offset}G)$, and $B_{Out} = G_B'*(B_{In} - \text{Offset}B)$.

This process then has the result that the points brighter than the definition point are converted to be bright and the points darker than it are made darker. The effect of the change on the histograms is illustrated in the lowest descriptor of FIG. 7, which also shows the final componentwise histograms obtained as a result of the image-processing chain 10 according to the invention. The mappings functions formed from the colour components are shown in the middle In/Out descriptor.

Linear conversion functions can be used in the method according to the invention. Non-linearities can also be added and typically are added, if the algorithm used is further combined with possible gamma correction, as an additional embodiment.

According to one embodiment, gamma correction GC can be implemented in such a way that first of all the type of image is defined. According to one example of the embodiment, this can be done by searching for the 25%, 50%, and 80%-points on the X-axis of the cumulative histograms, in which, at the 25%-point, for example, 25% of the pixels forming the image have an intensity value that is darker than, or equal to that of the point. Criteria for the intensity values, on the basis of which a decision can be made as to whether the shot currently being processed is normal, backlight, or low-contrast, are set to correspond to the percentage proportions 25, 50, and 80. After definition, a smaller gamma-value is selected in proportion to how much the image should be brightened. In the CEI/IEC organization (Commission Internationale de l'Eclairage (Vienna)/(International Electrochemical Commission (Geneva)) has selected the gamma level 0.45=1/2.2, in FIG. 8, for SRGB (standard RGB) images. In the method according to the invention, the gamma values can vary, for example, from 0.20 to 0.60. On a general, very approximate level, it can be stated that, in the gamma correction, the colour balance is adjusted in the final stage of the adjustment chain 10 by an increase in the order of power in which suitable intensity areas involution is made for the intensity values in which order of power corresponds to the gamma value. A direct power-order increase is not carried out in the initial areas of the curve, to prevent the change in the dark area being too rapid (steep).

The sub-stages of the colour-balance adjustment method according to the invention can, according to one embodiment, be summarized as follows.

1. Eliminate the pedestal PE,
2. Elimination vignetting VE,
3. Collect a histogram by filtering out the saturated pixel values $G_{(s)}$ and also the image points 15.1 corresponding to them,
4. Define an estimate for the illumination colours $R_{ill}$, $G_{ill}$, $B_{ill}$ from the cumulative histograms, using boundary conditions $t_1$, $t_2$, $t_3$ according to the method of the invention,
5. Define using the estimate of the illumination colour, necessary colour-conversion mapping functions and using them adjust the developed boundary conditions and limitations,
6. Adjust the darkest value of the colour components R, G, B,
7. Use the addition and histogram data when deciding on the visual optimal value for the gamma correction.

Stage 3, 4, 5, and 6 form the core components of the method according to the invention. It should be noted that, depending on the implementations, these stages can be rearranged or combined in several different ways.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

The invention claimed is:

1. A method in a digital image processing chain in a device for adjusting a colour balance comprising:
   inputting to the device value-sets of colour components R, G, B which have been formed by imaging a subject by pixels,
   forming component-specific histograms from the value-sets of the colour components,
   forming cumulative histograms from the component-specific histograms,
   defining an illumination colour corresponding to at least one colour component from the cumulative histograms,
   defining a gain factor adjusting the colour balance for at least two colour components using a target colour and the defined illumination colour,
   defining from an essentially flat area of a colour curve at the ends of the cumulative histograms a common point $h_i$, at which colour-component wise pixel-intensity values $C_i$, $C_{i+1}$, corresponding to consecutive points $h_i$, $h_{i+1}$, meet criteria conditions set for at least one colour component defined from the essentially flat area of the colour curve at the ends of the cumulative histograms, and
   setting the colour-component wise intensity value $C_i$, corresponding to a common point $h_i$ for the at least one colour component to correspond to the illumination colour.

2. A method according to claim 1, further comprising defining the illumination colour from the cumulative histograms by searching for a smallest index i meeting the following sub-criteria:
   1) a ratio $r_C$ of the pixel values $C_i$, $C_{i+1}$, corresponding to two consecutive points $h_i$, $h_{i+1}$ selected according to a set interval division, is less than a first threshold value $t_1$ for each colour component, i.e.,
   $$r_C = \frac{C_i}{C_{i+1}} < t_1, C = (R, G, B),$$
   2) a sum of the ratios $r_c$ corresponding to the pixel values $C_i$, $C_{i+1}$ is less than a second threshold value $t_2$, where $R_i$, $G_i$, $B_i$ correspond to $C_i$ and $R_{i+1}$, $G_{i+1}$, $B_{i+1}$ correspond to $C_{i+1}$,
   $$\frac{R_i}{R_{i+1}} + \frac{G_i}{G_{i+1}} + \frac{B_i}{B_{i+1}} < t_2,$$
   and
   3) the ratio of the relative speeds of change of the pixel values $C_i$, $C_{i+1}$ between the maximum pixel-value change and the minimum pixel-value change is less than a third threshold value $t_3$,
   $$\frac{\max((C_i - C_{i+1})/(C_{i+1}), \text{ in which } C \in R\|G\|B)}{\min((C_i - C_{i+1})/(C_{i+1}), \text{ in which } C \in R\|G\|B)} < t_3,$$
   and in which the intensity values $C_i$ of each colour component corresponding to the point $h_i$, meeting the conditions 1-3, are set to correspond to the illumination colour.

3. A method corresponding to claim 2, wherein the first threshold value $t_1$ varies within the range 1.0 to 1.5.

4. A method according to claim 2, wherein the second threshold value $t_2$ varies within the range 3.0 to 4.0.

5. A method according to claim 2, wherein the third threshold value $t_3$ varies within the range 3.0 to 5.

6. A method according to claim 1, further comprising performing a pedestal elimination on the pixel values of a raw matrix prior to the colour-balance adjustment.

7. A method according to claim 6, comprising performing the pedestal elimination, at least partly linearly, such that
   when the pixel-value level of a colour component is below a threshold value, an offset is deducted by direct subtraction, and, then, at a same time, deducting,
   the offset and gaining the pixel-values in such a way that the maximum pixel-value level does not substantially diminish.

8. A method according to claim 1, further comprising performing a vignetting elimination procedure after the pedestal elimination and before the colour-balance adjustment.

9. A method according to claim 8, further comprising using a spatially varying offset and a pixel-value gain factor in the vignetting elimination procedure.

10. A method according to claim 9, further comprising developing the gain factor separately for each colour component.

11. A method according to claim 1, further comprising performing a dark-colour correction procedure in which, as sub-stages,
   pixel values meeting a threshold condition are determined from the cumulative histogram,
   a defined darkest colour component is stretched using an offset of a defined magnitude towards the dark end of the histogram, while also processing the other colour components in a same proportion, and
   readjustment is performed on the gains of the conversion functions.

12. A method according to claim 1, further comprising defining a median pixel value for each colour component and, if a median pixel value of a selected reference component and a median pixel value of a colour component differ from each other in a set manner, adjusting the gains in order to reduce the difference.

13. A method according to claim 1, further comprising performing a gamma-correction stage, in which
   a shot type is defined from the cumulative histograms,
   on the basis of the shot-type definition, the gamma value selected for use in the gamma correction is reduced in proportion to an amount the image is to be brightened, wherein the gamma value is in the range of 0.10 to 0.80.

14. A method according to claim 1, further comprising filtering, prior to the formation of the cumulative histograms, at least one pixel value out of at least one value set in which the pixel value of the same image point meets a selected criterion.

15. An apparatus in a digital image processing chain for adjusting a colour balance comprising:
   an input configured to image a subject by pixels to form value-sets of colour components R, G, B,
   a first processing element configured to form component wise histograms from the value-sets of the colour components,
   a second processing element configured to form cumulative histograms from the component wise histograms,
   a third processing element configured to define an illumination colour corresponding to at least one colour component from the cumulative histograms, a fourth processing element configured to define a gain factor for at least two colour components adjusting the colour balance using target colour and the defined illumination colour, a fifth processing element configured to define, from an essentially flat area of the colour curve at an end of the cumulative histograms, a point $h_i$, in which colour-component wise pixel-intensity values $C_i$, $C_{i+1}$ corresponding to the consecutive points $h_i$, $h_{i+1}$, are arranged to meet criteria conditions set for them for at least one colour component, and a sixth processing element configured to set the color-componentwise intensity value $C_i$, corresponding to the defined common point $h_i$, for at least one color component to correspond to the illumination colour.

16. An apparatus according to claim 15, wherein the apparatus also includes a functionality, arranged before the colour-balance adjustment, for performing pedestal elimination on pixel values of a raw matrix.

17. An apparatus according to claim 15, wherein the apparatus also includes a seventh processing element configured to perform vignetting elimination after the pedestal elimination and before the colour-balance adjustment.

18. An apparatus according to claim 15, wherein the apparatus comprises means for correcting a dark colour.

19. An apparatus according to claim 15, wherein the apparatus comprises means for filtering out prior to the formation of the cumulative histograms at least such pixel values of at least one value set, in which a pixel value of the same image point in at least one value set meets a selected criterion.

20. An equipment for adjusting colour balance, in which the equipment includes a digital image-processing chain, in which the chain includes means for imaging a subject by pixels to form value-sets of the colour components R, G, B, means for forming component wise histograms from the value-sets of the colour components, means for forming cumulative histograms from the component wise histograms, means for defining a illumination colour corresponding to at least one colour component from the cumulative histograms, means for defining a gain factor for at least two colour components adjusting the colour balance using a target colour and defined illumination colour, means for defining, from an essentially flat area of a colour curve at an end of the cumulative histograms, a point $h_i$, in which colour-component wise pixel-intensity values $C_i$, $C_{i+1}$, corresponding to consecutive points $h_i$, $h_{i+1}$, are arranged to meet criteria conditions for at least one colour component, and means for setting the color-componentwise intensity value $C_i$, corresponding to the defined common point $h_i$, for at least one color component to correspond to the illumination colour.

21. A computer readable storage medium embodied with a computer program comprising:

software for receiving image data, software for inputting value-sets of the colour components which have been formed by imaging a subject by pixels, software for forming component wise histograms from the value-sets R, G, B of the colour components, software for forming cumulative histograms from the component wise histograms, software for defining the illumination colour corresponding to at least one colour component from the cumulative histograms, software for defining a gain factor for at least two colour components, adjusting the colour balance using target colour, and defining illumination colour, software for defining, from an essentially flat area of the colour curve at the end of cumulative histograms, a point $h_i$, in which the colour-component wise pixel-intensity values $C_i$, $C_{i+1}$, corresponding to consecutive points $h_i$, $h_{i+1}$, are arranged to meet criteria conditions for at least one colour component, and software for setting the color-componentwise intensity value $C_i$, corresponding to the defined common point $h_i$, for at least one color component to correspond to the illumination colour.

22. A device in a digital image processing chain for adjusting a colour balance comprising:

means for inputting value-sets of colour components formed by imaging a subject by pixels, means for forming component wise histograms from the value-sets of the colour components, means for forming cumulative histograms from the component wise histograms, means for defining an illumination colour corresponding to at least one colour component from the cumulative histograms, means for defining a gain factor for at least two colour components adjusting a colour balance using a target colour and the defined illumination colour, means for defining, from an essentially flat area of a colour curve at an end of the cumulative histograms a point $h_i$ in which colour-component wise pixel-intensity values $C_i$, $C_{i+1}$ corresponding to consecutive points $h_i$, $h_{i+1}$ arranged to meet criteria conditions for at least one colour component, and means for setting the color-componentwise intensity value $C_i$, corresponding to the defined common point $h_i$, for at least one color component to correspond to the illumination colour.

23. A device according to claim 22, wherein the device comprises a functionality, arranged before the colour-balance adjustment, for performing pedestal elimination on pixel values of a raw matrix.

24. A device according to claim 22, wherein the device comprises means for performing vignetting elimination, which are preferably arranged after the pedestal elimination and before the colour-balance adjustment.

25. A device according to claim 22, wherein the device comprises means for correcting a dark colour.

26. A device according to claim 22, wherein the device comprises means for filtering out prior to the formation of the cumulative histograms at least such pixel values of at least one value set, in which the pixel value of the same image point in even one value set meets a selected criterion.

27. A device according to claim 22 further comprising means for imaging a subject by pixels to form value-sets of the colour components.

* * * * *